United States Patent
Lohmann

(10) Patent No.: US 11,359,584 B2
(45) Date of Patent: Jun. 14, 2022

(54) EXHAUST GAS RECIRCULATION HEAT EXCHANGER AND HEAT SHIELD

(71) Applicant: DEERE & COMPANY, Moline, IL (US)

(72) Inventor: Craig W. Lohmann, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 109 days.

(21) Appl. No.: 16/946,651

(22) Filed: Jun. 30, 2020

(65) Prior Publication Data

US 2021/0404424 A1     Dec. 30, 2021

(51) Int. Cl.
| | | |
|---|---|---|
| *F02M 26/23* | (2016.01) | |
| *F02M 26/29* | (2016.01) | |
| *F02M 26/12* | (2016.01) | |
| *B60R 13/08* | (2006.01) | |

(52) U.S. Cl.
CPC ......... *F02M 26/23* (2016.02); *B60R 13/0876* (2013.01); *F02M 26/12* (2016.02); *F02M 26/29* (2016.02)

(58) Field of Classification Search
CPC ........ F02M 26/23; F02M 26/12; F02M 26/29; B60R 13/0876
See application file for complete search history.

(56) References Cited

U.S. PATENT DOCUMENTS

| | | | |
|---|---|---|---|
| 8,261,816 B2 * | 9/2012 | Ambros | F28D 9/0031 |
| | | | 165/183 |
| 2014/0251579 A1 * | 9/2014 | Sloss | F01N 5/02 |
| | | | 165/96 |
| 2016/0215735 A1 | 7/2016 | Stobnicki | |

FOREIGN PATENT DOCUMENTS

CN           203796446 U       8/2014

* cited by examiner

*Primary Examiner* — Jacob M Amick
*Assistant Examiner* — Charles J Brauch

(57) ABSTRACT

An exhaust gas recirculation heat exchanger for allowing a flow of exhaust gas therethrough and a transfer of heat between the exhaust gas and a heat exchange fluid and a heat shield for shielding heat from exhaust gas flowing from an inlet of an exhaust gas recirculation heat exchanger toward a plurality of conduits disposed downstream from the inlet are provided. The heat shield includes a heat shield body and a plurality of apertures extending through the heat shield body and configured to be aligned with a plurality of conduits of the exhaust gas recirculation heat exchanger in a direction of flow of the exhaust gas through the exhaust gas recirculation heat exchanger.

20 Claims, 4 Drawing Sheets

EXHAUST GAS RECIRCULATION HEAT EXCHANGER AND HEAT SHIELD

BACKGROUND

Internal combustion engines emit exhaust gas that may include contents that are controlled under or the subject of environmental regulations. An engine may include an exhaust gas recirculation (EGR) device to modify the content of exhaust gas emissions, such as a reduction of nitrogen oxides (NOx), by recirculating exhaust gas from an exhaust manifold to an intake manifold of the internal combustion engine. A heat exchanger may be used in an exhaust gas recirculation device to reduce the temperature of the exhaust gas before the exhaust gas enters an intake of the internal combustion engine. Components of the heat exchanger in the exhaust gas recirculation device are subjected to high thermal loads as a result of high temperatures of the exhaust gas and high temperature differentials between the exhaust gas and a heat exchange fluid circulating through the heat exchanger.

SUMMARY

Various aspects of examples of the present disclosure are set out in the claims.

In accordance with an aspect of the present disclosure, an exhaust gas recirculation heat exchanger for allowing a flow of exhaust gas therethrough and a transfer of heat between the exhaust gas and a heat exchange fluid is provided. The exhaust gas recirculation heat exchanger includes an inlet configured to introduce the exhaust gas into the exhaust gas recirculation heat exchanger, a plurality of inner surfaces defining a cavity, a plurality of conduits disposed downstream from the inlet and configured to transfer heat between the exhaust gas and the heat exchange fluid, and a heat shield having a plurality of outer portions, the heat shield being disposed in the cavity between the inlet and the plurality of conduits such that the heat shield is floating to permit displacement of each of the plurality of outer portions relative to at least one of the plurality of inner surfaces.

The heat shield may be decoupled from the plurality of inner surfaces. The exhaust gas recirculation heat exchanger may further include at least one spring connected to at least one of the plurality of outer portions. The at least one spring may be formed with the heat shield. The at least one spring may be decoupled from the heat shield. A first outer portion of the plurality of outer portions may permit displacement of the first outer portion relative to one of the plurality of inner surfaces of the exhaust gas recirculation heat exchanger in a direction perpendicular to the flow of the exhaust gas through the exhaust gas recirculation heat exchanger. A second outer portion of the plurality of outer portions may permit displacement of the second outer portion relative to one of the plurality of inner surfaces of the exhaust gas recirculation heat exchanger in a direction parallel to the flow of the exhaust gas through the exhaust gas recirculation heat exchanger. The heat shield may include a plurality of apertures aligned with the plurality of conduits in a direction of flow of the exhaust gas through the exhaust gas recirculation heat exchanger. Each of the plurality of apertures may form an aperture flow path having a width less than a width of a conduit flow path of each of the plurality of conduits. The plurality of outer portions may be spaced from the plurality of inner surfaces to permit displacement of the heat shield relative to the plurality of inner surfaces. The heat shield may be formed from a first material that is different from a second material that forms the inner surfaces defining the cavity.

In accordance with an aspect of the present disclosure, a heat shield for shielding heat from exhaust gas flowing from an inlet of an exhaust gas recirculation heat exchanger toward a plurality of conduits disposed downstream from the inlet is provided. The heat shield includes a heat shield body extending in a direction perpendicular to a flow of the exhaust gas through the exhaust gas recirculation heat exchanger and comprising a plurality of outer portions configured to permit displacement of each of the plurality of outer portions relative to at least one of a plurality of inner surfaces of the exhaust gas recirculation heat exchanger and a plurality of apertures extending through the heat shield body and configured to be aligned with the plurality of conduits of the exhaust gas recirculation heat exchanger in a direction of flow of the exhaust gas through the exhaust gas recirculation heat exchanger.

The heat shield may further include at least one spring connected to at least one of the plurality of outer portions. The at least one spring may be formed with the heat shield body. The at least one spring may be decoupled from the heat shield body. A first outer portion of the plurality of outer portions may be configured to permit displacement of the first outer portion relative to one of the plurality of inner surfaces of the exhaust gas recirculation heat exchanger in a direction perpendicular to the flow of the exhaust gas through the exhaust gas recirculation heat exchanger. A second outer portion of the plurality of outer portions may be configured to permit displacement of the second outer portion relative to another of the plurality of inner surfaces of the exhaust gas recirculation heat exchanger in a direction parallel to the flow of the exhaust gas through the exhaust gas recirculation heat exchanger. Each of the plurality of apertures may be configured to form an aperture flow path having a width less than a width of a conduit flow path of each of the plurality of conduits. The plurality of outer portions may be configured to be spaced from the plurality of inner surfaces to permit displacement of the heat shield relative to the plurality of inner surfaces of the exhaust gas recirculation heat exchanger.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
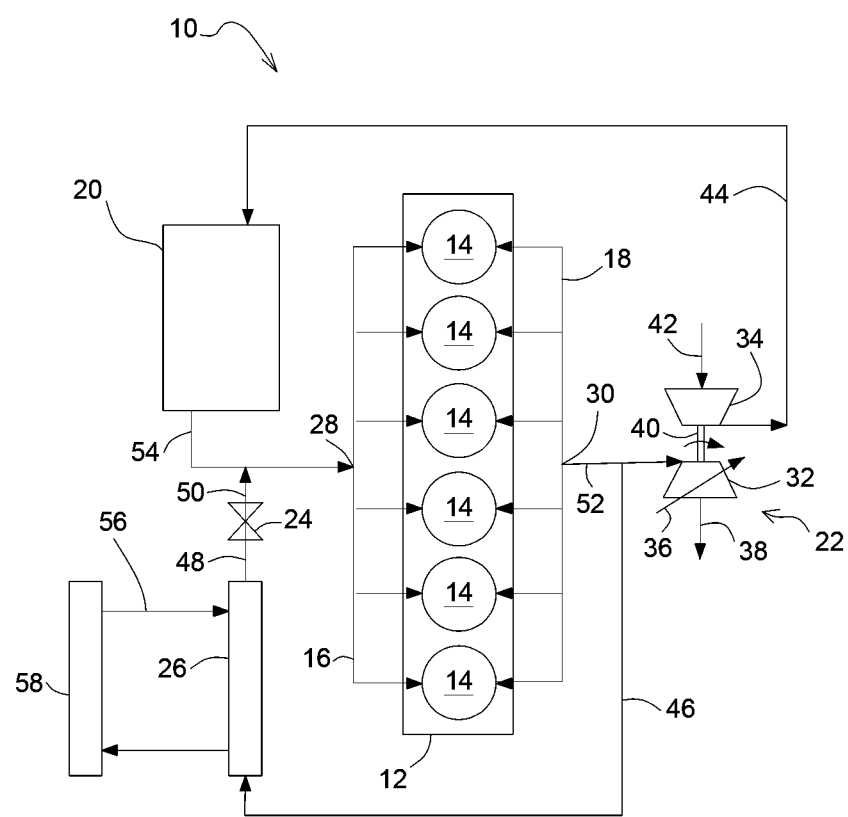
FIG. 1 illustrates a schematic view of an internal combustion engine having an exhaust gas recirculation heat exchanger in accordance with an embodiment of the present disclosure.
Figure 2:
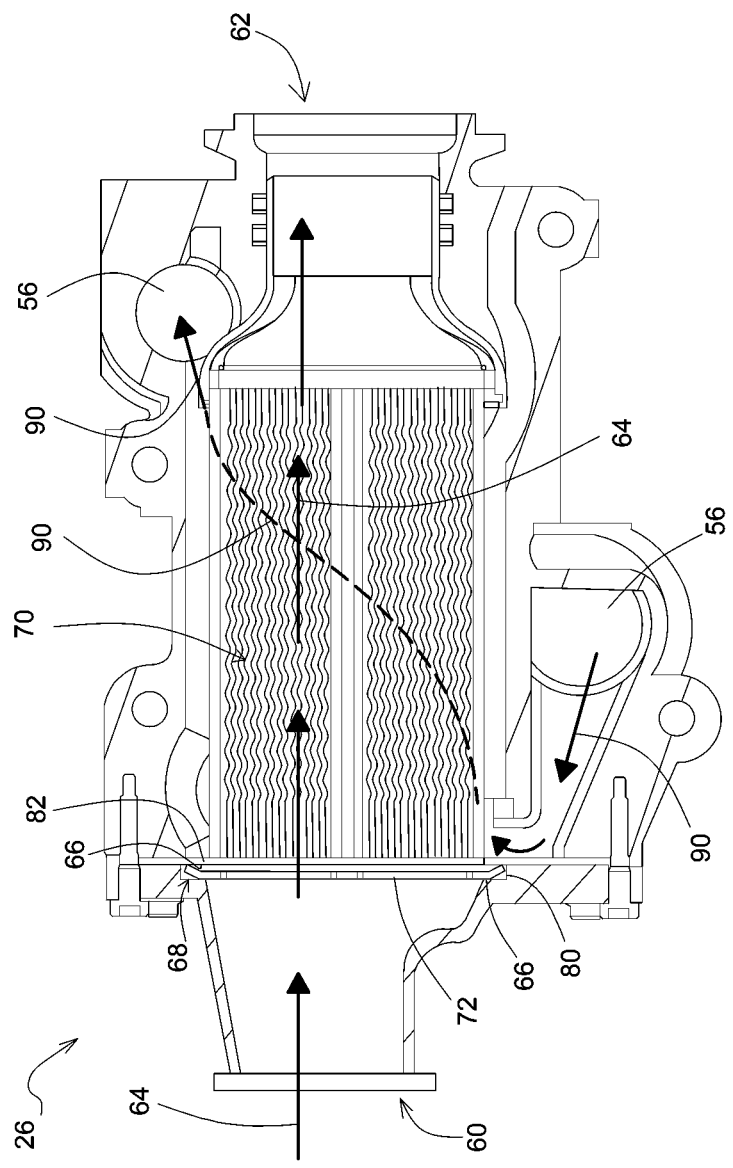
FIG. 2 is a cross sectional view of an exhaust gas recirculation heat exchanger and a heat shield in accordance with an embodiment of the present disclosure.
Figure 3:
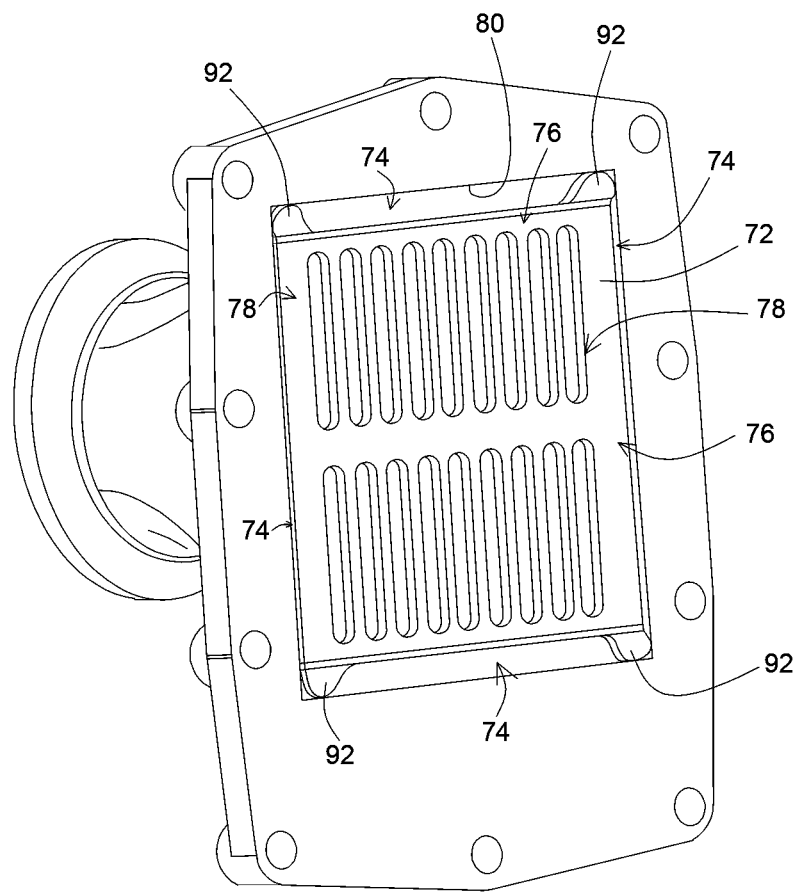
FIG. 3 is a partial view of an exhaust gas recirculation heat exchanger and a heat shield in accordance with an embodiment of the present disclosure.

At least one embodiment of the subject matter of this disclosure is understood by referring to FIGS. 1 through 3 of the drawings.

Referring now to FIG. 1, there is shown an embodiment of an internal combustion (IC) engine 10 of the present disclosure, which generally includes a block 12 having a plurality of combustion cylinders 14, intake manifold 16, exhaust manifold 18, charge air cooler 20, turbocharger 22, EGR valve 24 and EGR heat exchanger 26. The EGR heat exchanger 26 may be referred to as a heat exchanger or cooler in the present disclosure. In the embodiment shown, IC engine 10 is a diesel engine which is incorporated into a work machine, such as an agricultural tractor or combine or a construction work machine, but may be differently configured in additional embodiments, depending upon the application.

Block 12 is typically a cast metal block which is formed to define combustion cylinders 14. In the embodiment shown, block 12 includes six combustion cylinders 14, but may include a different number depending upon the application. Intake manifold 16 and exhaust manifold 18 are also typically formed from cast metal and are coupled with block 12 in conventional manner, such as by using bolts and gaskets. Intake manifold 16 and exhaust manifold 18 are each in fluid communication with combustion cylinders 14. Intake manifold 16 receives charge air from charge air cooler 20 at intake manifold inlet 28, and supplies charge air (which may be air or a fuel/air mixture) to combustion cylinders 14, such as by using fuel injectors (not shown).

Similarly, exhaust manifold 18 is in fluid communication with combustion cylinders 14, and includes an outlet 30 from which exhaust gas from combustion cylinders 14 is discharged to turbocharger 22.

Turbocharger 22 includes a variable geometry turbine (VGT) 32 and a compressor 34 in the illustrated embodiment, but any one or multiple turbine, compressor, or other component(s), other supercharger or charge air system(s), and/or configuration(s) or no turbocharger/charge air system may be used in or with embodiments of the present disclosure. VGT 32 is adjustably controllable as indicated by line 36, and includes an actuatable element which is controlled electronically using a controller (not shown). For example, VGT 32 may be actuated by changing the position of turbine blades, a variable size orifice, or other actuatable elements. The turbine within VGT 32 is driven by exhaust gas from exhaust manifold 18, and is exhausted outward, as indicated by arrow 38.

VGT 32 mechanically drives compressor 34 through a rotatable shaft 40. Compressor 34 is a fixed geometry compressor in the embodiment shown. Compressor 34 receives combustion air from the ambient environment as indicated by line 42, and discharges the compressed combustion air via line 44 to charge air cooler 20. As a result of the mechanical work through the compression of the combustion air, the heated charge air is cooled in charge air cooler 20 prior to being introduced at inlet 28 of intake manifold 16.

EGR valve 24 and EGR heat exchanger 26 are part of an EGR system which also includes a first fluid line 46, second fluid line 48 and third fluid line 50. The term fluid line, as used herein, is intended broadly to cover a conduit for transporting a gas such as exhaust gas and/or combustion air, as will be understood hereinafter.

First fluid line 46 is coupled at one end thereof with a fluid line 52 interconnecting exhaust manifold outlet 30 with VGT 32. First fluid line 46 is coupled at an opposite end thereof with EGR heat exchanger 26. Second fluid line 48 fluidly interconnects EGR heat exchanger 26 with EGR valve 24. Third fluid line 50 fluidly interconnects EGR valve 24 with fluid line 54 extending between charge air cooler 20 and inlet 28 of intake manifold 16.

In the embodiment shown in FIG. 1, heat exchange fluid is circulated via heat exchange fluid line 56 between the EGR heat exchanger 26 and a radiator 58 or other heat exchanging or cooling device to allow a transfer of heat between the exhaust gas and a heat exchange fluid. In additional embodiments not shown, it will be appreciated that the heat exchange fluid may be air, such as in an air-cooled heat exchanger arrangement, or any other gas or liquid fluid, and the heat exchanger 26 may not be connected to a radiator, heat exchanger, or line like the heat exchange fluid line 56 or the radiator 58.

In the embodiment shown in FIG. 1, first fluid line 46 is fluidly coupled with fluid line 52 extending between exhaust manifold 18 and VGT 32. However, it will also be understood that first fluid line 46 may be fluidly coupled directly with exhaust manifold 18 for certain applications. Similarly, third fluid line 50 is fluidly coupled with fluid line 54 interconnecting charge air cooler 20 and inlet 28 of intake air manifold 16. However, it will also be understood that third fluid line 50 may be coupled directly with intake air manifold 16 in certain applications. It will also be appreciated that line 46 may be positioned downstream of the turbocharger 22 or anywhere else along the exhaust gas flow path and/or line 50 may be positioned anywhere along the intake air path in additional embodiments.

During operation, IC engine 10 of embodiments included herein is operated to recirculate a selective amount of exhaust gas from exhaust manifold 18 to intake manifold 16 using an EGR system defined by first fluid line 46, EGR heat exchanger 26, second fluid line 48, EGR valve 24 and third fluid line 50. The EGR system could also be defined by first fluid line 46, EGR valve 24, second fluid line 48, EGR heat exchanger 26, and third fluid line 50, in that order connecting fluid line 52 to fluid line 54. A controller (not shown) selectively actuates EGR valve 24 to provide EGR flow of the exhaust gas in the EGR flow direction indicated by the large directional arrows on first fluid line 46 and third fluid line 50, as will be shown in further detail in FIG. 2.

Referring now to FIG. 2, the EGR heat exchanger 26 of the illustrated embodiments includes an inlet 60 configured to introduce exhaust gas into the exhaust gas recirculation heat exchanger 26 before a flow 64 of exhaust gas reaches an outlet 62 of the EGR heat exchanger 26 allowing exhaust gas to exit the heat exchanger 26. The EGR heat exchanger 26 further includes inner surfaces 66 defining a cavity 68, as shown in further detail in FIG. 4. The inner surfaces 66 of the illustrated embodiment includes edge surfaces 80 and face surfaces 82, but any orientation, configuration or number of inner surfaces 66 may be included in additional embodiments.

In the embodiment illustrated in FIG. 2, the cavity 68 is disposed downstream of the inlet 60 and upstream of conduits 70 disposed downstream from the inlet 60. The conduits 70 of the illustrated embodiment include tubes or other structures extending in the direction of the flow 64 of exhaust gas and having a round, ovoid, square, rectangular, and/or another cross-sectional geometry being capable of transporting a fluid. The conduits 70 are configured to transfer heat between the exhaust gas and a heat exchange fluid, such as the heat exchange fluid circulating through radiator 58 shown in the embodiment of FIG. 1 in a non-limiting example. The heat exchange fluid of the illustrated embodiment is a liquid coolant, but in one or more embodiments of the present disclosure includes a liquid, gas, or multi-phase coolant, water, or other fluid. The heat exchange fluid of the embodiment illustrated in FIG. 2 flows around, through, against, or otherwise past the conduits 70 along heat exchange fluid path 90 in the heat exchanger 26 to transfer heat from the exhaust gas to the heat exchange fluid. The conduits 70 of various embodiments of the present disclosure include straight, helical, and/or curved tubes or other structures and may include one or more fin, pin, plate, or other impingement or surface area-increasing structures.

Figure 4:
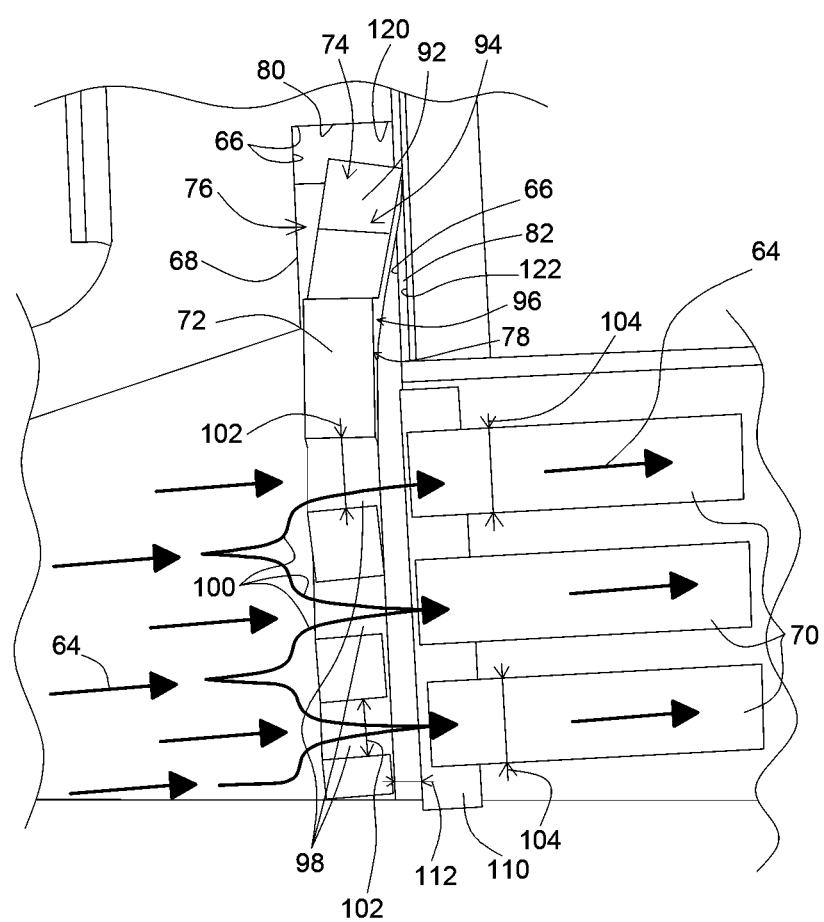
FIG. 4 is an enlarged cross sectional view of an exhaust gas recirculation heat exchanger and a heat shield in accordance with an embodiment of the present disclosure.

As shown in FIG. 2 and in further detail in FIGS. 3 and 4, the EGR heat exchanger 26 further includes a heat shield 72 for shielding heat from exhaust gas flowing from the inlet 60 of the EGR heat exchanger 26 toward the conduits 70 disposed downstream from the inlet 60. The heat shield 72 of the illustrated embodiment extends in a direction perpendicular to the flow 64 of the exhaust gas through the exhaust gas recirculation heat exchanger 26. The heat shield 72 includes one or more outer portions 74, best shown in FIGS. 3 and 4. The outer portions 74, as described herein, may include one or more edge portions 76 located at the perimeter edge of the heat shield 72 and/or one or more face portions 78 located at the surfaces facing in a direction parallel to the flow 64 of exhaust gas. The heat shield 72 is disposed in the cavity 68 between the inlet 60 and the conduits 70. In the illustrated embodiment, the heat shield 72 is floating, decoupled from the inner surfaces 66, and/or decoupled from its surrounding structure to permit displacement of one or more of the outer portions 74 relative to one or more of the inner surfaces 66. In the illustrated embodiment, the heat shield 72 is floating, decoupled from the inner surfaces 66, and/or decoupled from its surrounding structure to permit expansion and/or contraction of the heat shield 72 relative to the inner surfaces 66 and/or another portion or structure of the EGR heat exchanger 26.

In one or more embodiments, the heat shield 72 is formed from a first material that is different from a second material that forms the inner surfaces 66 defining the cavity 68. In a non-limiting example, the first material may be mild steel and the second material may be stainless steel. The heat shield 72 may be formed of a material different than a material of the cavity 68 or another portion of the EGR heat exchanger 26 as the heat shield 72 in the illustrated embodiment is not required to be welded or brazed to or formed integrally with the inner surfaces 66. However, in additional non-limiting examples, the first and second material are the same material and/or the heat shield 72 is formed with and/or coupled to the inner surface(s) 66 or another portion of the EGR heat exchanger 26.

Referring to the embodiments of FIGS. 3 and 4, the EGR heat exchanger 26 further includes one or more spring(s) 92 connected to one or more of the outer portion(s) 74. The spring 92 of the illustrated embodiment is a tab integrally formed with the heat shield 72 extending at an angle from the face portion(s) 78 of the heat shield 72 and/or the flow 64 of exhaust gas. The angle of the tab is between 5 and 45 degrees in an embodiment and between 10 and 30 degrees in another embodiment. While the spring 92 is connected to the outer portion 74 in the illustrated embodiment via rigid, integral formation with the heat shield 72 or otherwise formed as a portion of the heat shield 72, the spring 92 may be separate or decoupled from the heat shield 72, and may abut or be attached or coupled to the heat shield 72 in order to provide a resilient, elastic, and/or compliant portion or member with the heat shield 72. In the illustrated embodiment, there are four springs 92 disposed at four corners of the heat shield 72 as shown in FIG. 3.

In embodiments of this present disclosure, the outer portions 74 are spaced from the inner surfaces 66 to permit displacement of the heat shield 72 relative to the inner surfaces 66 and reduce thermal strain of the heat shield 72. FIG. 4 illustrates an embodiment of the present disclosure whereby a clearance 76 or other spacing between the heat shield 72 and the inner surfaces 66 of the EGR heat exchanger 26 is configured to permit displacement, movement, repositioning, and/or expansion of the heat shield 72 in the cavity 68. The spring(s) 92 further guides or positions the heat shield 72 in the cavity 68, limits or restrains movement of the heat shield 72 in the cavity 68, and/or otherwise prevents excessive or undesirable repositioning, movement, and/or vibration of the heat shield 72 in the cavity 68. As shown in the embodiment of FIG. 4, a first outer portion 94 of the outer portions 74 of the heat shield 72 permits displacement of the first outer portion 94 relative to a first inner surface 120 of the EGR heat exchanger 26 in a direction perpendicular to the flow 64 of the exhaust gas through the EGR heat exchanger 26. As further shown in the illustrated embodiment, a second outer portion 96 of the outer portions 74 permits displacement of the second outer portion 96 relative to a second inner surface 122 of the EGR heat exchanger 26 in a direction parallel to the flow 64 of the exhaust gas through the EGR heat exchanger 26. Although the spring 92 is shown in the embodiment of FIG. 4 to position or limit movement of the heat shield 72 in a direction parallel to the flow 64 of the exhaust gas, the spring(s) 92 and/or another spring may be utilized to position or limit movement of the heat shield 72 in a direction perpendicular to the flow 64 of the exhaust gas, such as by positioning and orienting the spring(s) 92 between the first outer portion 94 and the first inner surface 120.

As further shown in FIGS. 3 and 4, the heat shield 72 includes multiple apertures 98 aligned with the conduits 70 in a direction of the flow 64 of the exhaust gas through the EGR heat exchanger 26. Each of the apertures 98 forms an aperture flow path 100 having a width 102 less than a width 104 of a conduit flow path of each of the conduits 70. The heat shield 72 and/or the apertures 98 are configured to prevent, minimize, or reduce the thermal load on a header 110, the conduits 70, and/or another portion of the EGR exchanger 26 due to impingement or other heat transfer from the high temperature exhaust gas in the illustrated embodiment. Further, the heat shield 72 in the illustrated embodiment is spaced a distance 112 from the header 110 and/or the conduits 70 in order to further insulate or reduce heat transfer between the heat shield 72 and the header 110 and/or the conduits 70.

Without in any way limiting the scope, interpretation, or application of the claims appearing below, it will be appreciated that the EGR heat exchanger 26 and/or the heat shield 72 of the embodiments of the present disclosure reduce the thermal load on the header 110, the conduits 70, and/or other portions of the EGR heat exchanger 26. Further, the EGR heat exchanger 26 and/or the heat shield 72 of the embodiments of the present disclosure allow expansion and relative movement or repositioning of the heat shield 72 in order to reduce the thermal strain on the heat shield 72 and reduce or eliminate a need for brazing, fastening, or other attachment or coupling means of the heat shield 72 to the EGR heat exchanger 26. Furthermore, the EGR heat exchanger 26 and/or the heat shield 72 of the embodiments of the present disclosure securely position the heat shield 72 in the EGR heat exchanger 26 via the spring(s) 92 while permitting the beneficial functions described herein.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An exhaust gas recirculation heat exchanger for allowing a single direction flow of exhaust gas therethrough and a transfer of heat between the exhaust gas and a heat exchange fluid, the exhaust gas recirculation heat exchanger comprising:
an inlet configured to introduce the exhaust gas into the exhaust gas recirculation heat exchanger;
a plurality of inner surfaces defining a cavity;
a plurality of conduits disposed downstream from the inlet and configured to transfer heat between the exhaust gas and the heat exchange fluid; and
a heat shield having a plurality of outer portions, the heat shield being disposed in the cavity between the inlet and the plurality of conduits such that the heat shield is floating to permit displacement of each of the plurality of outer portions relative to at least one of the plurality of inner surfaces;
wherein a first outer portion of the plurality of outer portions permits displacement of the first outer portion relative to one of the plurality of inner surfaces of the exhaust gas recirculation heat exchanger in a direction perpendicular to the single direction flow of the exhaust gas through the exhaust gas recirculation heat exchanger.

2. The exhaust gas recirculation heat exchanger of claim 1, wherein the heat shield is decoupled from the plurality of inner surfaces.

3. The exhaust gas recirculation heat exchanger of claim 1, further comprising at least one spring connected to at least one of the plurality of outer portions.

4. The exhaust gas recirculation heat exchanger of claim 3, wherein the at least one spring is formed with the heat shield.

5. The exhaust gas recirculation heat exchanger of claim 3, wherein the at least one spring is decoupled from the heat shield.

6. The exhaust gas recirculation heat exchanger of claim 1, wherein a second outer portion of the plurality of outer portions permits displacement of the second outer portion relative to one of the plurality of inner surfaces of the exhaust gas recirculation heat exchanger in a direction parallel to the single direction flow of the exhaust gas through the exhaust gas recirculation heat exchanger.

7. The exhaust gas recirculation heat exchanger of claim 1, wherein the heat shield comprises a plurality of apertures aligned with the plurality of conduits in the single direction flow of the exhaust gas through the exhaust gas recirculation heat exchanger.

8. The exhaust gas recirculation heat exchanger of claim 7, wherein each of the plurality of apertures forms an aperture flow path having a width less than a width of a conduit flow path of each of the plurality of conduits.

9. The exhaust gas recirculation heat exchanger of claim 1, wherein the plurality of outer portions is spaced from the plurality of inner surfaces to permit displacement of the heat shield relative to the plurality of inner surfaces.

10. The exhaust gas recirculation heat exchanger of claim 1, wherein the heat shield is formed from a first material that is different from a second material that forms the inner surfaces defining the cavity.

11. A heat shield for shielding heat from exhaust gas flowing in a single direction flow from an inlet of an exhaust gas recirculation heat exchanger toward a plurality of conduits disposed downstream from the inlet, the heat shield comprising:
a heat shield body extending in a direction perpendicular to the single direction flow of the exhaust gas through the exhaust gas recirculation heat exchanger and comprising a plurality of outer portions configured to permit displacement of each of the plurality of outer portions relative to at least one of a plurality of inner surfaces of the exhaust gas recirculation heat exchanger; and
a plurality of apertures extending through the heat shield body and configured to be aligned with the plurality of conduits of the exhaust gas recirculation heat exchanger in the single direction flow of the exhaust gas through the exhaust gas recirculation heat exchanger.

12. The heat shield of claim 11, further comprising at least one spring connected to at least one of the plurality of outer portions.

13. The heat shield of claim 12, wherein the at least one spring is formed with the heat shield body.

14. The heat shield of claim 12, wherein the at least one spring is decoupled from the heat shield body.

15. The heat shield of claim 11, wherein a first outer portion of the plurality of outer portions is configured to permit displacement of the first outer portion relative to one of the plurality of inner surfaces of the exhaust gas recirculation heat exchanger in a direction perpendicular to the single direction flow of the exhaust gas through the exhaust gas recirculation heat exchanger.

16. The heat shield of claim 15, wherein a second outer portion of the plurality of outer portions is configured to permit displacement of the second outer portion relative to another of the plurality of inner surfaces of the exhaust gas recirculation heat exchanger in a direction parallel to the single direction flow of the exhaust gas through the exhaust gas recirculation heat exchanger.

17. The heat shield of claim 11, wherein each of the plurality of apertures is configured to form an aperture flow path having a width less than a width of a conduit flow path of each of the plurality of conduits.

18. The heat shield of claim 11, wherein the plurality of outer portions is configured to be spaced from the plurality of inner surfaces to permit displacement of the heat shield relative to the plurality of inner surfaces of the exhaust gas recirculation heat exchanger.

19. An exhaust gas recirculation heat exchanger for allowing a single direction flow of exhaust gas therethrough and a transfer of heat between the exhaust gas and a heat exchange fluid, the exhaust gas recirculation heat exchanger comprising:

an inlet configured to introduce the exhaust gas into the exhaust gas recirculation heat exchanger;

a plurality of inner surfaces defining a cavity;

a plurality of conduits disposed downstream from the inlet and configured to transfer heat between the exhaust gas and the heat exchange fluid; and a heat shield having a plurality of outer portions, the heat shield being disposed in the cavity between the inlet and the plurality of conduits such that the heat shield is floating to permit displacement of each of the plurality of outer portions relative to at least one of the plurality of inner surfaces; and at least one spring connected to at least one of the plurality of outer portions and being disposed in the cavity between the inlet and the plurality of conduits such that the at least one spring is configured for displacement relative to at least one of the plurality of inner surfaces with at least one of the plurality of outer portions.

20. The exhaust gas recirculation heat exchanger of claim 19, wherein the at least one spring comprises a tab integrally formed with the heat shield and extending at an angle relative to the heat shield.

* * * * *